UNITED STATES PATENT OFFICE.

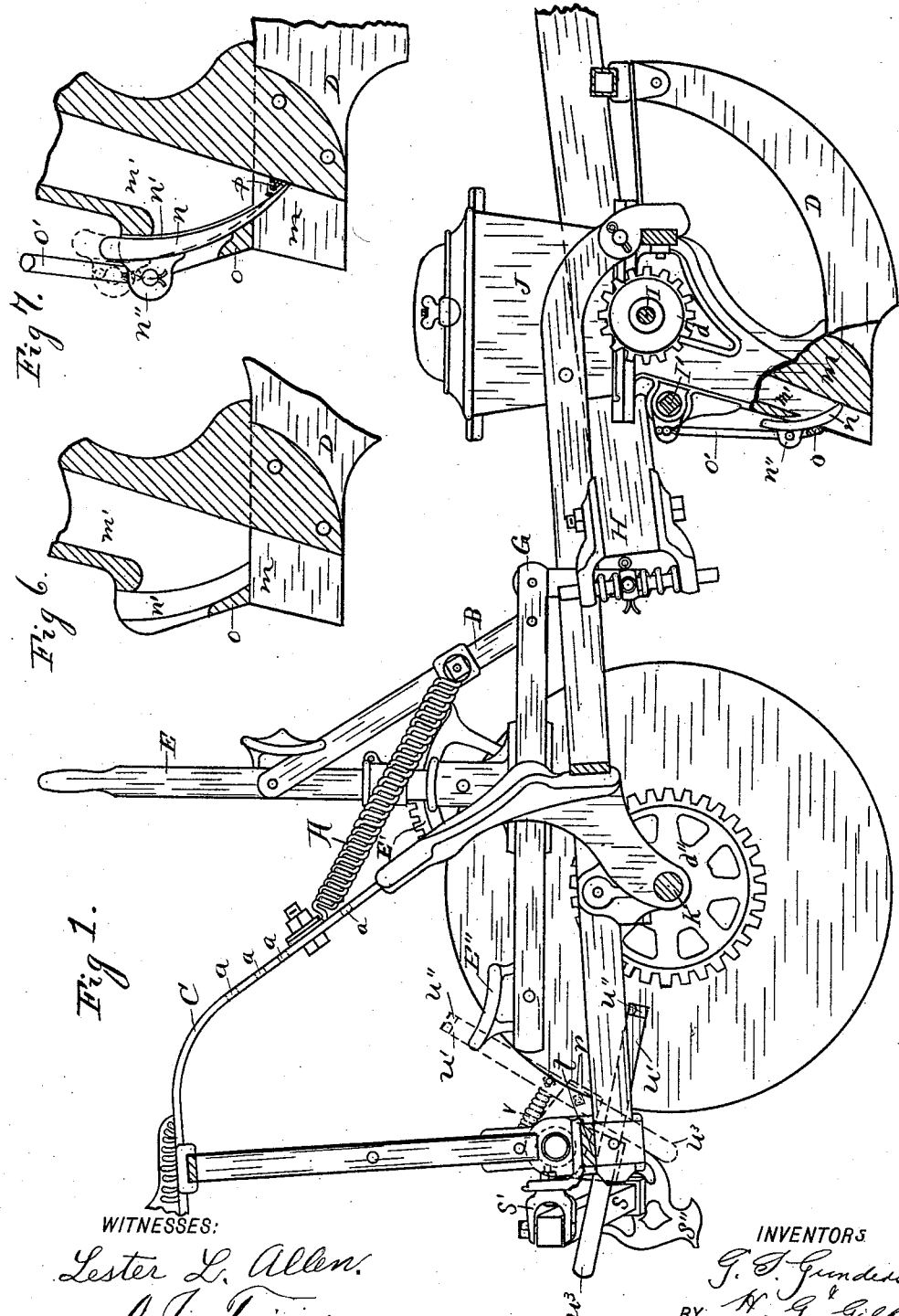

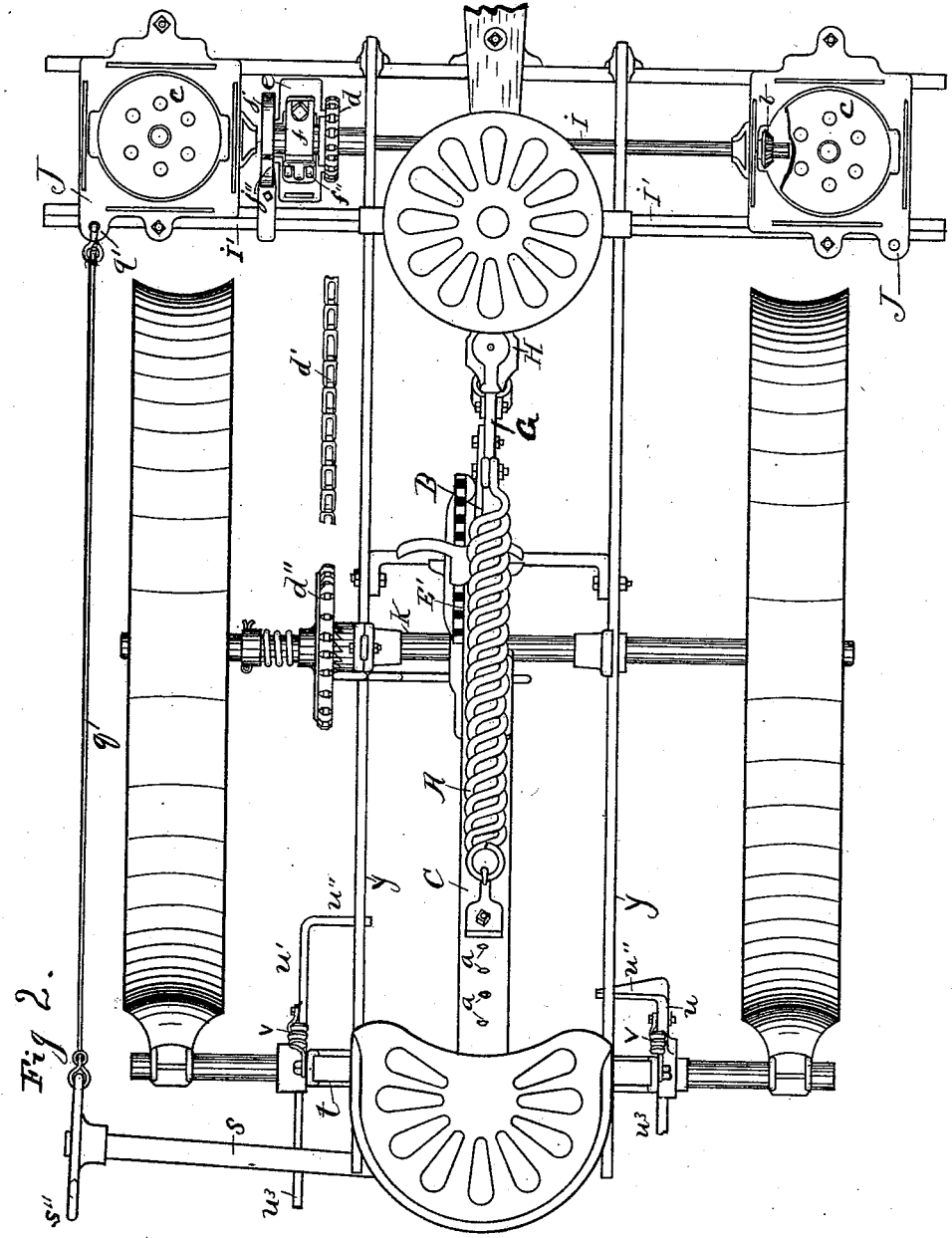

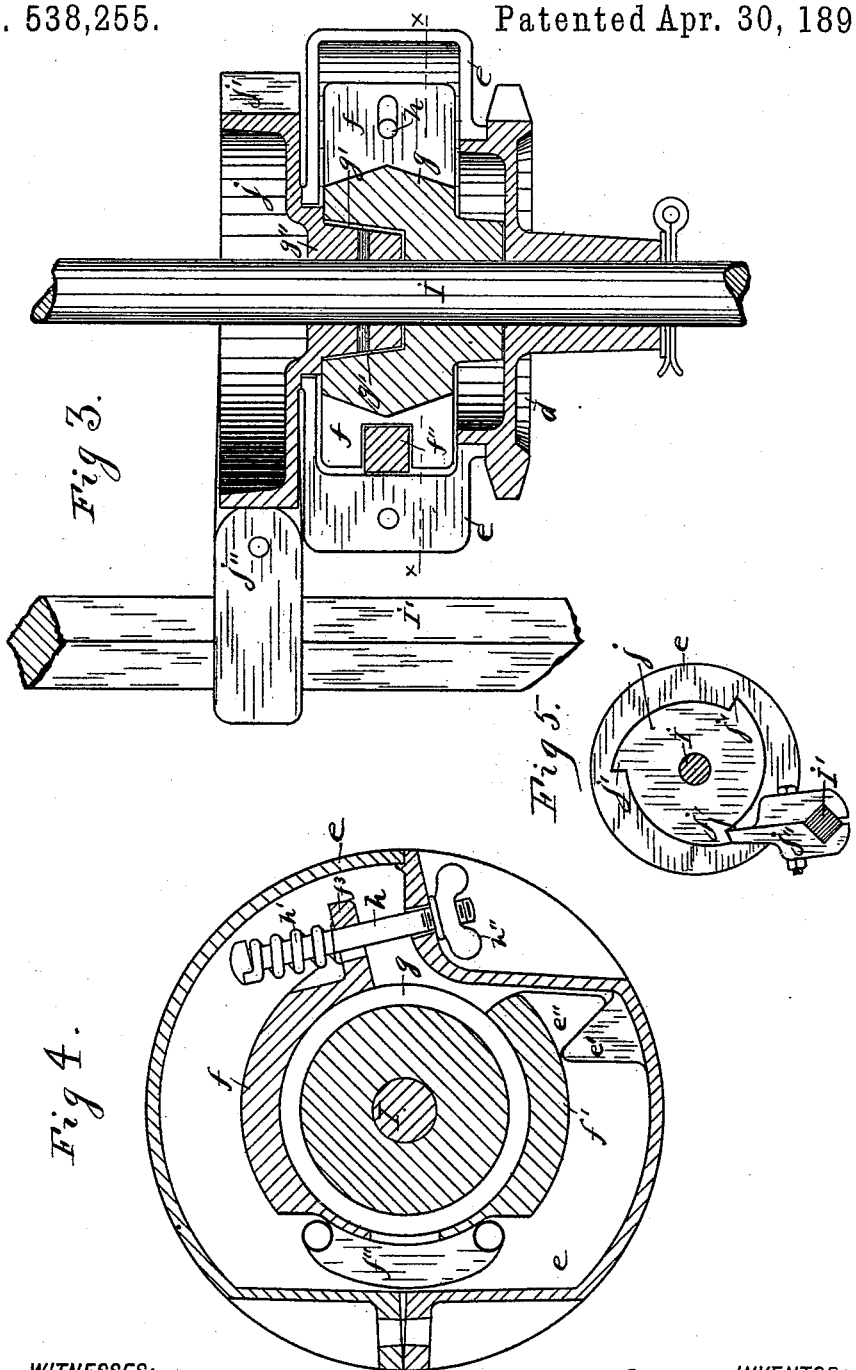

GILBERT S. GUNDERSEN AND HENRY G. GILBERT, OF MIDDLETOWN, OHIO, ASSIGNORS TO THE McSHERRY MANUFACTURING COMPANY, OF SAME PLACE.

CORN-PLANTER.

SPECIFICATION forming part of Letters Patent No. 538,255, dated April 30, 1895.

Application filed October 23, 1894. Serial No. 526,775. (No model.)

*To all whom it may concern:*

Be it known that we, GILBERT S. GUNDERSEN and HENRY G. GILBERT, of Middletown, county of Butler, State of Ohio, have invented new and useful Improvements in Corn-Planters; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to useful improvements in corn planters, and has for its object to supply certain needed improvements.

Owing to the naturally variable nature of the ground, it is necessary to employ means for conveniently adjusting the plows or runners with reference to their contact with said ground. For example,—when the planting is being done in loose ground, the amount of weight or pressure on the runners should not be as great as where the ground is hard, and deep planting is required.

Therefore the object of our invention is to provide means for adjusting the runners to meet these variable conditions, and to relieve those parts of the machine that are subject to the greatest wear by relieving said runners of unnecessary weight when light planting is being done or the machine is being hauled about the field, all of which may be done by the driver, without leaving his seat.

A further object is to provide improved means for obtaining an intermittent rotary movement of the dropping plates, whereby a systematic and regular drop of the corn is insured.

A still further object is to provide means for releasing the corn from the heels of the runners in a way that will prevent the grains from crowding upon each other after they have been deposited in the ground; and to provide an improved marker.

To these ends said improvements consist of means that will be fully described in the specification and pointed out in the claims.

In the annexed drawings, forming a part of this specification, Figure 1 is a side elevation, partly in section, of a corn planter having our improvements thereon; Fig. 2, a plan of the same, one of the dropping plates being broken away to show one of the bevel gears; Fig. 3, an enlarged horizontal section through the friction clutch and adjunctive devices; Fig. 4, a section on the line $x—x$ of Fig. 3; Fig. 5, a view showing the dog ($j''$) in engagement with the ratchet wheel ($j$); Fig. 6, an enlarged sectional view of the heel of the runners, showing the slot in which the valve works. Fig. 7, a similar view showing the valve, and its movement in full and dotted lines.

Similar letters of reference indicate corresponding parts in the several views.

As the general construction of the carrying frame; dropping plates; check wire and the devices connected therewith is not new, it is not deemed necessary to illustrate them in the drawings, or to specify them beyond what is required to enable an understanding of the parts comprising the invention.

The letter A designates a coil spring of the necessary strength. One end of this spring is attached to a bar B; the other end to a seat standard C, upon which the driver's seat is partly supported. In the seat standard C there are openings ($a$) shown in dotted lines, by means of which the spring A may be attached to said bar to exert a greater or less tension in manipulating the runners,—that is to say, by attaching said spring to the highest opening in said bar, the tension will be sufficient to maintain the runners D in a raised position, or in a suitable position for shallow planting, without necessitating the locking of the hand lever E with the segment rack E'.

The bar B, to which one end of the spring A is attached, has its respective ends attached to a bar or foot lever G, and to the hand lever. In turn, the bar G is attached to the tongue H, by any suitable connections, as shown in Fig. 1. When the spring A is mounted as shown in this figure (wherein it is not expanded from its normal or contracted condition) less than one half the ordinary amount of force applied to the hand lever E or foot lever E'' is sufficient to raise the runners, and when said spring is coupled at the highest point on the seat standard C, a slight draft on said levers will raise the runners with ease. This result is not alone due to the strength of the spring, but is also due to the way in which said spring is mounted; the front end thereof being attached forward of the fulcrum of the lever E.

The letter I designates a shaft, provided with suitable bearings in the frame. The ends of this shaft project under the grain hoppers J—J, and have rigidly mounted thereon, bevel gears ($b$) that mesh with crown teeth on the lower face of the dropping plates ($c$)—($c$) which plates are turned thereby. Each of these dropping plates is provided with a suitable number of holes. In the present instance, there are six, each one of which may contain one or more grains of corn, which they deposit into the heels of the runners. Upon shaft I, adjacent to one of the grain hoppers, there is a loose running sprocket wheel ($d$) driven by a chain ($d'$) from a sprocket wheel ($d''$) on the shaft ($k$) of the ground wheels.

($e$) designates a two part housing having a fixed connection with the sprocket wheel ($d$). Within this housing the following parts forming a friction clutch, are inclosed, through the agency of which, and other adjunctive devices, the dropping plates ($c$) are subjected to an intermittent rotary movement.

($f$)—($f'$) designate straps coupled at one end by a link ($f''$).

($g$) is a conical shaped journal, the periphery of which is inclosed and pressed by the straps ($f$)—($f'$). The latter one of these straps is maintained in an operative position by a lug ($e'$) that projects from the inner side of the housing, and against which a similar projection ($e''$) on said strap, bears. Both of the straps are brought in close contact with the periphery of the journal ($g$) by a bolt ($h$) which penetrates the housing, and a flanged portion ($f^3$) of the strap ($f$). The inner end of the bolt ($h$) is encircled by a spiral spring ($h'$) and the outer end is fitted with a wing nut ($h''$) by which the parts are tightened. The journal ($g$) is provided in one side with a square opening ($g'$) into which, fits a similar shaped boss ($g''$) projecting from the wheel ($j$) having ratchets ($j'$), as shown in Fig. 5. This ratchet wheel is keyed to the shaft I.

From the foregoing description, it is plain, the housing, clutch mechanism and ratchet wheel ($j$) together with the shaft I, are subjected to a common rotary movement by the sprocket wheel ($d$). All of said parts will turn. To arrest this movement and thereby stop the movement of the plates ($c$)—($c$) at predetermined times, in order to permit the holes in said dropping plates to be successively brought over the runners to deposit the grains of corn into the openings ($m'$) of the heels.

($j''$) is a dog rigidly mounted on the rock shaft I' parallel with the shaft I.

($m$) designates the heel of the runners with openings ($m'$) through which the corn drops to the sliding valve ($n$). This valve is essentially curved as shown in the drawings, and fits in a slot ($n'$) in said heel.

($o$) is a bridge across the opening ($m'$) that serves to hold the valve in place.

($o'$) is a rod pivoted to a lug ($n''$) on the valve, and connected to the rock shaft I', by which said valve ($n$) is opened and closed.

($p$) represents grains of corn held by the point of the valve, and which will be dropped into the furrow, one free from the other, when the valve is drawn outwardly and upwardly in the slot ($n'$). The path of the movement of the valve is indicated by the dotted lines in Fig. 7, where it will be observed, an outward and upward movement is imparted thereto, which effectually releases the corn and permits the grains to fall side by side. The shaft I' may be actuated by the buttons on a check wire and devices operated thereby (which are well known features in corn planters, and therefore are not shown). The same movement of the shaft I' that raises the sliding valves ($n$) also throws the dog ($j''$) down and out of gear with the ratchet wheel ($j$) and said wheel instantly starts to revolve, and with it, of course the shaft and devices thereon. The dog ($j''$), in the next instant snaps back, on the return of the shaft I' to its normal position, and is again in a position to catch the next tooth on the wheel ($j$) to stop the shaft I. When this stoppage is made, the straps ($f$) and ($f'$) slide around the conical journal ($g$), always maintaining a grip thereon, however, sufficient to turn it immediately upon the ratchet wheel being released by the dog ($j''$). By this intermittent motion, each successive hole in the dropping plates is brought over the runners, and their contents deposited as hereinbefore described. Then the dropping plates stop until the next button on the check wire is passed.

Referring to another feature, ($s$) designates a guide marker pole supported at its inner end by a swivel ($s'$) mounted on the rear cross bar ($t$) by which said pole may be turned from one side of the machine to the other. This pole projects a suitable distance beyond the ground wheels, and has a marker ($s''$) on said projecting end that marks the ground to guide the operator in planting the next row. The outer end of the pole is held by a rope ($q$) which is attached to an eye in the hopper bottom ($b'$).

($u$) and ($u'$) designate foot levers pivoted to brackets ($r$) on the bar ($t$). These levers have inwardly turned ends ($u''$), and their outer ends ($u^3$) project under the pole ($s$).

($v$)—($v$) designate coil springs that serve to hold the forward ends of the levers ($u$) and ($u'$) in elevated positions; the rear end being always down to insure its catching the pole ($s$).

At the end of each row, it becomes necessary to raise the marker clear of the ground. This is done by pressing on the right or left lever ($u$) or ($u'$) until its forward end ($u''$) engages with the lower side of the bars ($y$) of the frame and thereby become locked. The pole is readily lowered again by releasing the levers from their locked position.

We do not claim to be the first to impart an intermittent rotary motion to the dropping plates of a corn planter, for this has been done before, with partial success, but we do assert that we are the first to obtain this intermittent rotary motion by means of the specially constructed clutch and adjunctive devices herein shown and described.

Having fully described our invention, we desire to claim—

1. In a corn planter, the combination with the frame, hand lever, lifting bar B attached to said hand lever and movable thereby; and the seat standard C; of a lifting spring A, adapted to an adjustable attachment with said standard C, and also to an attachment with the bar B, by means of which combination, means are provided for greatly facilitating the raising of the runners, or otherwise manipulating them to suit the conditions of the soil, substantially as herein described.

2. In a corn planter, the combination with a revolving shaft (I), a rock shaft (I'), bevel gears (b) mounted on said revolving shaft, of a sprocket wheel (d) loosely mounted on said revolving shaft, a clutch housing (e) rigidly attached to said sprocket wheel, a ratchet wheel (j) rigidly mounted on said revolving shaft, a pawl (j'') rigidly mounted on the rock shaft (I') and adapted to be lowered in the path of said ratchet wheel at predetermined times, friction clutch mechanism inclosed in said housing, and having a connection with said ratchet wheel, substantially as described.

3. The shaft (I), bevel gears (b) and dropping plates (c), in combination with the sprocket wheel (d), the housing (e) keyed to said wheel, the straps (f) and (f'), and conical journal (g) inclosed in said housing, the ratchet wheel (j) movable with said journal, and the dog (j'') mounted adjacent to said ratchet wheel to arrest the movement of the shaft (I), at predetermined times, substantially as and for the purposes specified.

4. In a corn planter, the rock shaft (I'), and runners provided with slots (n'), and bridge (o), in combination with sliding valves (n) having the curvature shown, lugs (n'') on said valves, rods (o') rigidly connected to the shaft (I'), and pivotally connected to the lugs (n''), and means for actuating said shaft, substantially as described.

5. In a corn planter, the combination with the runners, dropping plates to deliver corn thereto, shaft (I), bevel gears (b) on said shaft, the rock shaft (I'), of a sprocket wheel (d) loosely, and a ratchet wheel (j) rigidly mounted on said shaft (I), a two part clutch housing attached to said sprocket wheel, friction clutch mechanism inclosed in said housing and connected to said ratchet wheel, a ratchet pawl (j'') rigidly mounted on said rock shaft, curved valves (n) slidingly mounted in the heels of said runners, and connections between said valves and the rock shaft whereby means are provided for intermittently feeding the corn to said valves whereon the grains are enabled to rest side by side, and for discharging said grains of corn to the furrow to rest in a similar manner, substantially as described.

6. In a corn planter, the combination with a carrying frame having the longitudinal bars (y)—(y), and the cross bar (t), of guide marker pole (s) attached to the bar (t) by a swivel (s'), a marker (s'') on said pole, angular levers (u) and (u') mounted on the bar (t), said levers projecting rearwardly of the machine and under the pole (s), and having their forward ends terminating at right angles, and adapted to interlock with the frame bars (y)—(y), and tension springs on said levers, substantially as described.

In testimony whereof we have hereunto set our hands this 16th day of October, 1894.

GILBERT S. GUNDERSEN.
HENRY G. GILBERT.

Witnesses:
R. J. McCARTY,
E. C. BOYER.